United States Statutory Invention Registration [19]

[11] Reg. Number: H364

Bares et al. [43] Published: Nov. 3, 1987

[54] PUSH BUTTON DIGITAL REGULATOR FOR A.C. INVERTER DRIVES

[75] Inventors: Frank P. Bares, New Hartford; Clifford G. Moon, Jr., Wethersfield, both of Conn.

[73] Assignee: Emhart Industries, Inc., Farmington, Conn.

[21] Appl. No.: 930,606

[22] Filed: Nov. 12, 1986

[51] Int. Cl.[4] ..... C03B 17/00

[52] U.S. Cl. ..... 65/158; 65/164

[56] References Cited

U.S. PATENT DOCUMENTS 4,007,028 2/1977 Bublitz et al. ..... 65/163

*Primary Examiner*—Stephen C. Buczinski
*Assistant Examiner*—Linda J. Wallace
*Attorney, Agent, or Firm*—Arthur B. Moore

[57] ABSTRACT

A push button-actuated digital regulator circuit for use with inverter drives for use with inverter drives for A.C. motors of glassware manufacturing apparatus. The digital regulator responds to an operator is pushing UP and DOWN push buttons to increase or decrease the frequency of an oscillator output signal to the inverter. Maximum and minimum frequency limitations are preset at the oscillator and inhibit the operator command signal in the event a commanded increase or decrease would exceed one of the limits. A counter array provides adjustable frequency outputs to the inverter in binary-coded decimal. In a first embodiment, the circuit responds to continuous depression of one of the buttons by adjusting the output frequency at a rate established by an on-board oscillator. Alternatively, adjustment of the output over a plurality of frequency counts may require repeated pressing of the appropriate push button.

1 Claim, 2 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PUSH BUTTON DIGITAL REGULATOR FOR A.C. INVERTER DRIVES

BACKGROUND OF THE INVENTION

The present invention relates to variable speed AC motor drives for glassware forming machines, and more particularly, to an improved digital regulator for inverter drives.

It is accepted practice to use AC inverter drives as power sources for motors for various elements of a glassware manufacturing line including glass gob feeders, gob distributors, conveyors, etc. It is typical in such apparatus to drive these elements in synchronism, and for this purpose it is common practice to employ AC synchronous motors. These motors have well-defined speed-to-frequency characteristics, and such systems employ AC inverters having variable frequency outputs. The usual prior art controller for said A.C. inverter drives relies upon an analog output from a computer to regulate the frequency of the inverter signal, or allows manual control using one or more thumbwheels to vary the frequency. Analog systems suffer frequency drift due to temperature and voltage changes, and will lose the drive command in the event of a controller failure.

Another such system is shown in prior art U S. Pat. No. 4,007,028 to Bublitz et al. This system includes a common frequency control which is set up manually using a plurality of decade switches, such a thumbwheel switches, to vary the output frequency of a reference source. With reference to FIG. 1 of this reference, adjusting the decade switches 28 changes the output frequency of inverters 21–23, and hence simultaneously changes the speed of various drive motors. Such system further includes individual frequency control circuits each comprising a digital regulator and multiplier to vary a multiplication factor of individual multiplier circuits. The manual adjusting means for such multipliers again takes the form of decade switches, such as thumbwheel switches. These multiplier circuits, in effect, serve as "electronic gear boxes". This digital control apparatus risks the loss of the control inputs from panel 28 causing a loss of the reference frequency signal from source 27.

Accordingly, it is a primary object of the invention to provide an improved regulator unit for an AC inverter drive of a glassware forming machine. Subsidiary objects include achieving a low-cost, easy to install system.

Another object of the invention is to provide a more dependable control system than one which depends upon digital thumbwheel controls.

SUMMARY OF THE INVENTION

In fulfilling the above and additional objects, the invention provides for a digitally regulated AC inverter drive for glassware manufacturing apparatus. In the manual control mode, this digital regulator circuit acts upon a pair of push button inputs from the operator which push buttons respectively cause an increase and decrease of the inverter output. The push button inputs signals, appropriately conditioned, are passed through logic circuits which impose upper and lower frequency limitations on the increase frequency and decrease frequency command signals, respectively. Low and high frequency limits are established on the associated master oscillator circuit. The gated command signals are delivered to an array of sychronous up/down decade counters, which provide digitally coded frequency output signals to the inverter.

In a preferred embodiment of the invention, the digital regulator circuitry continues to sample the state of the push buttons at a rate determined by an on-board oscillator or clock. Therefore, when the operator continuously depresses a given push button the inverter frequency will continue to increase or decrease at such rate.

BRIEF SUMMARY OF THE DRAWINGS

The above and additional aspects of the invention are illustrated in the following detailed description of the preferred embodiment, in conjunction with the drawings in which.

DETAILED DESCRIPTION

Figure 1A:
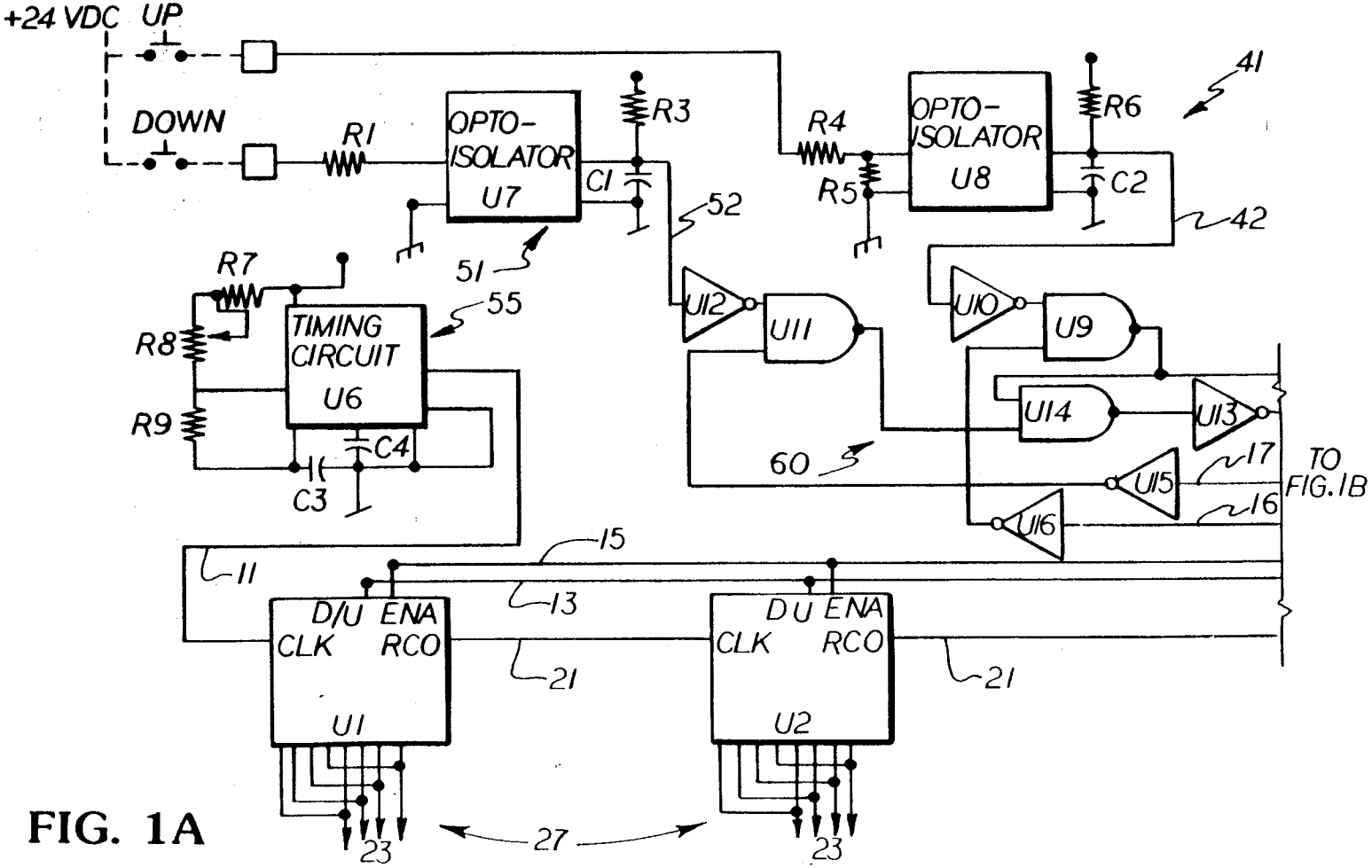
FIGS. 1*a* and 1*b* are portions of a complete figure and, when joined in a side-by-side relationship, form a complete figure hereinafter referred to as FIG. 1, said FIG. 1 being a schematic diagram of a digital control circuit for an inverter drive in accordance with a preferred embodiment of the invention.
Figure 1B:
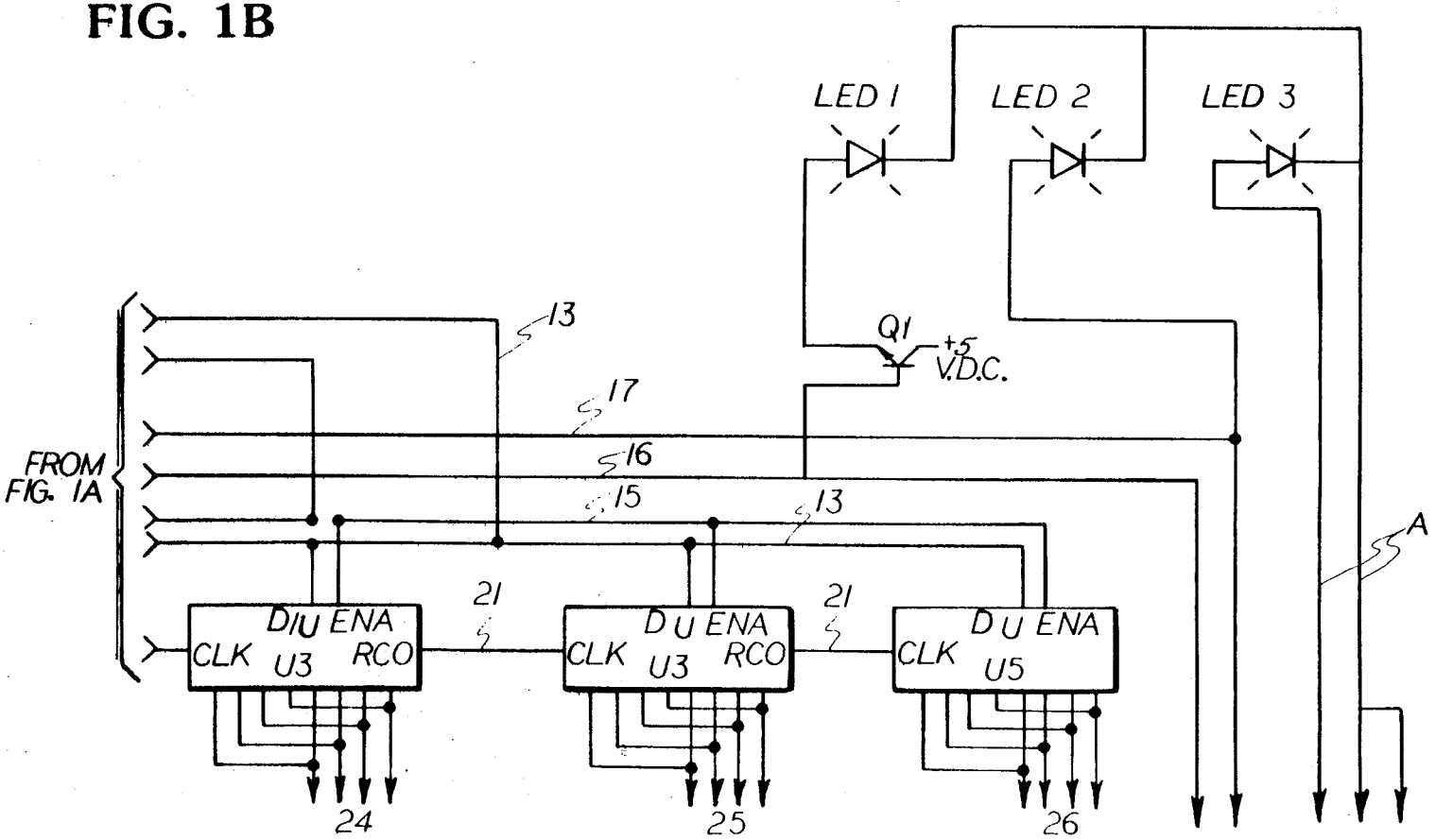

Reference should now be had to FIG. 1, which is a schematic diagram of a push button-actuated digital control circuit 10 in accordance with a preferred embodiment of the invention. The control circuit 10 of FIG. 1 is designed to operate in cooperation with an oscillator circuit, and acts as a frequency preset assembly to manually control the output frequency of the oscillator. Conventional inverter oscillator circuits may be employed, as well known in the art, and hence the oscillator circuit is not described in detail herein. For example, the oscillator circuit may consist of an Emerson Digital Oscillator board, part no. 12-71288010, of Emerson Industrial Controls Co. Alternatively, if manual control over the inverter output frequency is not desired, the operator may switch the system into automatic mode wherein such frequency will be subject to computer control. Such automatic mode is not the subject of the instant invention.

As shown in FIG. 1, assemblies 41 and 51 are optoisolator circuits which reduce the 24 volt D.C. input signal level from respective up and down push buttons 40, 50 to a five volt level compatible with high speed CMOS digital logic circuitry. The command signals on respective lines 42 and 52 are gated by NAND gate network 60, as explained below, to test against high and low frequency limit signals on lines 16 and 17 respectively. The low and high frequency limit signals are both taken from the oscillator circuit (not shown). The lower limit is a preset value based on the frequency speed characteristics of the AC motor which is being driven by the inverter. When the oscillator reaches this value, line 17 goes high and "At Set" LED2 lights. The upper limit is based on a high speed limit of the inverter drive, and again is set by the operator at the oscillator assembly. "MAX LIMIT" LED1 indicates a high state of the upper speed limit on line 16. The "At Start Point" LED3 is used during the initial application of power to the oscillator to indicate that the oscillator is in sync.

With further reference to FIG. 1, the elements U1–U5 are advantageously a cascaded series of synchronous up/down counters. In an operable embodiment, these counters are types 74HC190 counters of Fairchild Corp., which provide binary coded decimals (BCD) outputs. Synchronous operation is provided by having flip-flops within each of the counters clocked simultaneously so that via the CLK and RCO terminals (as explained below) so that the outputs 22–26 change coincident with each other when so instructed by the steering logic. The steering logic for each counter is controlled via the D/U and ENA terminals: each respective counter will count down if the other conditions are met where there is a low state at the D/U terminal; and a high state at the ENA terminal inhibits counting. This steering logic cooperates with the NAND gate network 60 and the inputs thereto as follows:

The opto-isolator networks 41, 51 each provide a low output when the respective push button is depressed. As mentioned above, the low limit line 17 and high limit line 16 are each normally in the low state, but switch to the high state when the respective limit is reached. Taking into account the actions of inverters U10, U12, and U16, this means that each of the NAND gates U9, U11 will provide a high output unless the respective pushbutton is pushed and the other input is not at the "at limit" state. NAND gate U14 prevents both push button command signals from being effective simultaneously. This is because a low output of NAND gate U14 will cause a high to the ENA terminals of counters U1–U5, inhibiting counting.

If the NAND gate U9 for the "UP" push button produces a command (low) output to the D/U terminals of counters U1–U5, this will put the counters in a count up state. If, however, the output of NAND gate U9 is high and the NAND gate U14 enables the counters as described above, (i.e. the down NAND gate 211 produces a command output), the counters will count down.

Timing circuit 55 is for producing accurate oscillations. Illustratively, U6 may comprise a μA555 single timing circuit of Fairchild Corp. In the circuit 55, the timing circuit U6 receives a triggering signal via terminal 57, triggers itself and runs as a multivibrator. The external capacitor C3 charges through resistors R7 and R9 and potentiometer R8, and discharges through resistor R9 only. The duty cycle may be precisely set by the ratio of resistance R9 to a sum of the resistances R7, R8, and R9. The frequency of oscillation may also be calculated from these resistances and from the value of the capacitance C3. Setting potentiometer R8 to a suitable value will therefore provide a desired repetition rate of the pulsed output signal on line 11. This signal is used to clock the count adjustment function at counters U1–U5, as follows. The outputs 22–26 of the counters U1–U5 are triggered on a low-to-high transition of the respective CLK inputs assuming that the enable input is low. The ripple clock outputs (RCO) of counters U1–U4 permits cascading of the various counters by feeding each such output to the clock input of the succeeding synchronous counter.

Counters U1–U5 provide BCD outputs to the oscillator board which in turn provides a frequency signal to the inverter. These counters provide a five decimal frequency range wherein counter U1 represents hundreds of Hertz, and U5 represents hundredths of Hertz. Illustratively, the circuit of FIG. 1 permits variation of the preset frequency over an acceleration/deceleration range on the order of 15 Hertz.

While reference has been made above to specific embodiments, it will be apparent to those skilled in the art that various modifications and alterations may be made thereto without departing from the spirit of the present invention. Therefore, it is intended that the scope of this invention be ascertained by reference to the following claims.

We claim:

1. In an inverter drive system for alternating current motors acting as drive sources for mechanisms of a glassware forming machine, said inverter drive including an oscillator circuit which provides a variable frequency output in response to a digital control signal, a manually controlled system for adjusting the output frequency of said oscillator circuit, comprising up and down push button input circuits, each providing a first DC output level only during the pressing of a respective push button;

high and low limit circuits each providing "at limit" signal levels only when the oscillator output frequency reaches a respective user defined limit;

a logic network for receiving the output of said up and down push button circuits and high and low limit circuits, and for providing binary output signals representing down/up and enable/disable states, an enable state representing the pressing of one but not both of the push buttons while the respective limit circuit is not in its "at limit" state, and said "up" and "down" states being responsive to the pressing of the respective push button;

a timing circuit for providing periodic output signals at user-selected time intervals;

a digital counter array for receiving said down/up and enable/disable signals and said periodic output signals, and for counting up or down only during the receipt of a periodic output signal and enable signal, counting up in such state only when receiving an up signal from the logic network, wherein said digital counters provide output signals to the oscillator circuit to determine the digital value of its frequency output.

* * * * *